__US012463800B2__

United States Patent
Vega Crespo et al.

(10) Patent No.: US 12,463,800 B2
(45) Date of Patent: Nov. 4, 2025

(54) SYSTEM FOR ENCRYPTING AND AUTHENTICATING COMMUNICATIONS WITH MUTUAL AUTHENTICATION OF THE COMMUNICATORS

(71) Applicants: José Agustín Vega Crespo, Torrelodones (ES); José Domingo Carrillo Verdún, Madrid (ES)

(72) Inventors: José Agustín Vega Crespo, Torrelodones (ES); José Domingo Carrillo Verdún, Madrid (ES)

( * ) Notice: Subject to any disclaimer, the term of this patent is extended or adjusted under 35 U.S.C. 154(b) by 236 days.

(21) Appl. No.: 18/017,656

(22) PCT Filed: Jun. 21, 2021

(86) PCT No.: PCT/ES2021/070461
§ 371 (c)(1),
(2) Date: Jan. 23, 2023

(87) PCT Pub. No.: WO2022/018310
PCT Pub. Date: Jan. 27, 2022

(65) Prior Publication Data
US 2023/0275748 A1      Aug. 31, 2023

(30) Foreign Application Priority Data

Jul. 24, 2020    (ES) .............................. ES202030772

(51) Int. Cl.
*H04L 9/08*         (2006.01)
(52) U.S. Cl.
CPC .......... *H04L 9/0825* (2013.01); *H04L 9/0869* (2013.01); *H04L 9/0894* (2013.01)
(58) Field of Classification Search
CPC .... H04L 9/0825; H04L 9/0869; H04L 9/0894
See application file for complete search history.

(56) References Cited

U.S. PATENT DOCUMENTS

| 9,780,954 B2 * | 10/2017 | Bhattacharya ........ H04L 9/3273 |
| 2008/0034216 A1 * | 2/2008 | Law ...................... H04L 9/3273 |
| | | 713/168 |

(Continued)

FOREIGN PATENT DOCUMENTS

| EP | 2763346 A1 | 8/2014 |
| EP | 2903204 A1 | 8/2015 |

(Continued)

OTHER PUBLICATIONS

International Search Report for related application PCT/ES2021/070461 prepared by the Spanish Patent & Trademark Office and having a mailing date of Sep. 27, 2021, official English language translation provided.

(Continued)

*Primary Examiner* — Kambiz Zand
*Assistant Examiner* — Afaq Ali
(74) *Attorney, Agent, or Firm* — Hassan Abbas Shakir; Shakir Law PLLC

(57) ABSTRACT

A system for encrypting and authenticating communications with mutual authentication of the communicators is used between two parties who exchange messages supported by a communication network in which the parties are unequivocally identified. The system includes processes supported by respective authentication applications available to each party on a hardware/software device, the applications having at least: an identifier (Id) of the authentication application (AA); an encryption key (CC) of each party; a random number generator for encrypting and authenticating messages (Mx); and an encryption algorithm that is shared with the rest of the parties of the system, allowing them to encrypt and decrypt the sent/received messages.

21 Claims, 3 Drawing Sheets

(56) References Cited

U.S. PATENT DOCUMENTS

| | | | |
|---|---|---|---|
| 2009/0113530 A1 | 4/2009 | Brainard et al. | |
| 2009/0185687 A1* | 7/2009 | Wankmueller | H04L 9/3273 |
| | | | 380/277 |
| 2018/0144341 A1* | 5/2018 | Kärkkäinen | G06Q 20/02 |
| 2018/0205561 A1* | 7/2018 | Le Saint | H04L 9/3242 |
| 2020/0153640 A1* | 5/2020 | Ranellucci | H04L 9/3255 |
| 2020/0358788 A1* | 11/2020 | Lee | H04L 9/0866 |

FOREIGN PATENT DOCUMENTS

| | | |
|---|---|---|
| KR | 20070096073 A | 10/2007 |
| KR | 20080050040 A | 6/2008 |
| WO | 2008019194 A2 | 2/2008 |

OTHER PUBLICATIONS

Written Opinion of the International Searching Authority for related application PCT/ES2021/070461 prepared by the Spanish Patent & Trademark Office and having a mailing date of Sep. 28, 2021.

Extended European Search Report for related EPO patent application 21845919.6-1218 prepared by the European Patent Office dated Jul. 9, 2024, 7 pgs., in English.

Publication, "A Survey of Authentication Protocol Literature: Version 1.0" by John Clark et al., dated Nov. 17, 1997, pp. 1-109, retrieved from www-users.cs.york.ac.uk/~jac/papers/drareviewsps.ps.

* cited by examiner

SYSTEM FOR ENCRYPTING AND AUTHENTICATING COMMUNICATIONS WITH MUTUAL AUTHENTICATION OF THE COMMUNICATORS

CROSS-REFERENCE TO RELATED APPLICATIONS

This application is a national stage under 35 U.S.C. § 371 of PCT patent application PCT/ES2021/070461 filed on 21 Jun. 2021, which is pending, which is hereby incorporated by reference in its entirety for all purposes, and to which the present application claims priority.

PCT/ES2021/070461 claims priority to European Patent Application P202030772 filed on 24 Jul. 2020, which is hereby incorporated by reference in its entirety for all purposes.

BACKGROUND OF THE INVENTION

1. Field of the Invention

The invention is in the area of information technologies, within the cybersecurity sector, specifically in the authentication of communications carried out in cyberspace.

More particularly, the invention is directed to a method of and a system for the encryption and authentication of communications with mutual authentication of the communicating parties.

Even more particularly, the invention is directed to a a method of and a system where at least two parties exchange electronic communication messages using computer equipment making use of a mutual authentication protocol to unequivocally identify each other and wherein the mutual authentication also serves to authenticate and confirm the authorship of the data exchanged in the course of the dialogue they conduct, normally for the purpose of carrying out a transaction between them.

2. Discussion of the Related Art

It is clear that in today's society, communications play a fundamental role in our daily activities and it is on their security that these activities can be carried out correctly.

There are many vulnerabilities that can occur in any type of communication and even more so when there are so many people dedicated to doing business by exploiting its weaknesses.

According to a report prepared by the consultancy firm Marsh & McLennan together with Mandiat, the economic value of cybercrime in 2018 was around €600 billion (33% more than in 2016). More than 90% of cyber incidents were caused by social engineering techniques, mainly phishing attacks that impersonate the identity of the sender or recipient of a communication in order to commit fraud. And phishing can be avoided by subjecting the sender and recipient of a communication to a mutual authentication process before the communication is made, as this eliminates the possibility of impersonation.

What is important in secure communication?

For the sender, what is important is that the message, once it has been sent, reaches its intended recipients, and only them, and that it is not manipulated along the way.

It is essential for the recipient to know who the real sender is and that the original content of the message has not been tampered with.

If these needs of the sender and recipient of a message are to be met, said message must have undergone authentication based on a message authentication system in which:

In order to know that a communication has indeed reached its addressee "its transmission protocol must provide for a reply from the addressee to the sender" confirming that the message sent has indeed reached the addressee, making sure that it is indeed the addressee who sent the reply.

If the message is to reach only its intended recipient, it is necessary that "the transmission is carried out using a strong algorithm and encryption key" common to both sender and receiver and known only to them.

In order for the recipient to know that the message could not have been tampered with, something must be added to the message to verify its integrity. One way to do this in a transmission may be to "hash" the message to provide one and the same precise value for a given message.

If the sender and receiver of a communication are to be correctly identified, it will be necessary that "mutual authentication" is carried out between them, which is that which allows both parties to identify each other without any doubt as to who each of them is. To this end, a message exchange protocol will be followed, the purpose of which will be mutual identification.

The greater or lower vulnerability of a communications authentication system depends to a large extent on the degree of compliance with the above points.

Almost all existing communication systems implement them partially and very few implement all of them.

A wide variety of communication authentication systems are now available on the market, using different means and procedures, to achieve authentication of communications between two parties in a non-face-to-face dialogue.

Until relatively recently, these systems only authenticated the sender of the message and did so (and still do in too many cases) using a customer identifier and a fixed value key (PIN). This form of identification is not very effective as any criminal could be impersonating the recipient (the company) and thus get hold of the sender's data to use them for his own benefit. On the other hand, these data that are being sent to identify the sender are no longer sufficient as many of them are already being fraudulently obtained and sold to criminals. It is clear that static passwords cannot be trusted.

Many companies are now complementing the previous authentication system by sending an SMS with an OTP (One Time Password) to the user's mobile phone to be forwarded to the company, so that, in principle, the company can be sure that the person requesting to operate has the user's mobile phone and, therefore, is the user. This way of proceeding would be in line with what international standards are demanding, which is multi-factor authentication. The problem is that the SMS that are being used have the disadvantage that their sender has no way of verifying whether the person receiving them is the correct recipient given the ease with which they can be intercepted by a criminal.

There are other message authentication systems, with the purpose of authenticating access for a company's online operations, which use one or two OTP keys (one-time passwords). In this type of system, if a user suffers a phishing/pharming attack in real time, a criminal can get hold of the first OTP key and, using it before its validity expires, can impersonate the user.

There are also systems that use two OTP keys and one fixed key or three OTP keys. All of them can easily be the target of a Man In The Middle attack if they do not make use of at least a second (physical or logical) communication channel in their communications.

What all these authentication systems have in common is that they are used by people who, in most cases, are forced to memorize passwords and type them in without making mistakes. They also have to take precautions to ensure that no one tricks them and gets hold of them.

According to studies by reputable companies, many of the frauds committed by criminals accessing information within a computer system originate from a previous oversight or deception of a user with access to that system. The criminal, using available malware and usually social engineering, manages to get hold of the user's credentials and impersonates the user to gain access to the system.

It is generally agreed that it is the user's intervention in the authentication process that is usually the weakest link that can break the robustness of the authentication process. It is for this reason that new authentication processes should try to automate everything that the user is currently asked to do. Thus, "minimizing user involvement in authentication processes could improve usability and reduce fraud".

The aim of the present invention is, therefore, the development of a message exchange system that allows to solve the above-mentioned problems incorporating as differentiating characteristics the above-mentioned solutions, i.e.:

That the communications make use of a strong encryption algorithm and key to ensure the integrity and confidentiality of communications.

That the communications should incorporate a hash function in the message to verify its integrity.

That its communication protocol provides for a response from the addressee to the sender that assures the sender that the addressee has received the communication and that there can be no subsequent repudiation of both sending and receiving the communication.

That the message exchange protocol between the parties performs mutual authentication between sender and recipient that assures the recipient who is the sender and the sender who is the recipient.

That their communications make use of at least a second communication channel which, in the event of interception of the communications of one of them, allows for checks to be carried out on the other which can detect manipulation of the information, thus preventing "Man In The Middle" type frauds.

That its communication protocol should minimize user intervention in the communication process, avoiding errors and possible social engineering tricks that facilitate fraud, especially of the phishing kind.

SUMMARY OF THE INVENTION

The system for the encryption and authentication of communications with mutual authentication of the communicating parties proposed by the invention satisfactorily achieves the above-mentioned objectives, the details which make it possible and which suitably distinguish it being set out in the final claims accompanying the present description.

What the invention proposes, as noted above, is a system in which two parties exchange electronic communication messages by means of computer equipment using a mutual authentication protocol so that at the end of the process the parties are unequivocally identified with each other and the information that travels in the exchanged messages is also authenticated.

The authentication system mainly applies to a dialogue between two parties (Party A and Party B) exchanging two or more messages in order to resolve a transaction of interest to both parties. The dialogue is supported by the authentication system in which these parties are integrated and unequivocally identified and communicate with each other through one or more communication channels.

Said Authentication System is composed of processes supported by the respective Authentication Applications available to each of the Parties integrated in the Authentication System.

To this End:

Each Party has a hardware/software device, running an Authentication Application (AA) containing the software that implements its way of acting according to the mutual authentication procedure.

Each Party has an Authentication Application containing:
an Identifier (Id) that identifies the Authentication Application (AA) uniquely from the rest of the Authentication Applications integrated in the Authentication System;
the Identifier of each of the Authentication Applications of the other Parties that may become its interlocutor within the Authentication System;
one or more communication channels with which the authentication application exchanges messages;
the Encryption Key (CC) of each of the Parties that may become their interlocutor, these values being different for each pair of Parties.

EXAMPLE

Parts A, B, C can all relate to each other reciprocally:
For that, each Party shall have the values:
A—IdA,
IdB—CCAB;
IdC—CCAC
B—IdB,
IdA—CCAB;
IdC—CCBC
C—IdC,
IdB—CCBC;
IdA—CCAC Thus, for the dialogues between A and B they need their Authentication Applications to share their IdA, IdB and the CCAB value;
a generator of Pseudorandom Values to be used to encrypt and/or authenticate Mx messages;
an encryption algorithm, which it shares with the rest of the System Parties, that allows them to encrypt and decrypt the messages that are sent/received;
optionally, when one of the parties is a natural person, an Activation Code (AC) specific to each Authentication Application, AA, which, for security reasons, authenticates that person against the AA and must be used to activate said AA so that nobody other than that person can make use of the AA and its data (including the CC) without that person's knowledge.

The tasks to be performed by the Parties A and B with their Authentication Applications are:

Party A
It initiates the procedure for a dialogue with Party B, in which three messages are to be exchanged, and for that, making use of its Device and its AAA Authentication Application:
It generates and stores four Pseudorandom Values, CCM2, VAM2 and CCM3, VAM3 to be used as Encryption Keys (CCMx) of the messages and Authentication Values (VAMx) in the M2 and M3 messages respectively. All these generated values will have a certain validity time that will be controlled in their usage process. The number of pseudo-random values to be generated will depend on how many messages are to be exchanged throughout the dialogue between the Parties so that there are two values to be used for each M2 message and successive M2 messages.

It obtains the Timestamp of the moment (TS); it prepares the information to be sent containing, at least, the values IdB, IdA, TS, CCM2, VAM2, CCM3, VAM3 and DATA1, where DATA1 will contain information to be communicated to Party B; it applies to this information a given hash function (Secure Hash Algorithm hash function or any other similar algorithm) obtaining a Summary Value of the information to be transmitted in the message M1, VRM1; it encrypts with CCAB, obtaining CCAB (TS, CCM2, VAM2, CCM3, VAM3, DATA1, VRM1).

It sends to Party B an M1 message containing, among other possible data: IdB; IdA; CCAB(TS, CCM2, VAM2, CCM3, VAM3, DATA1, VRM1).

Optionally, for operational and control purposes, the identifier of the sender of the message in the communication network supporting the dialogue may also travel encrypted by CCAB.

Party B

It continues with the procedure for a dialogue with Party A, in which three messages are to be exchanged, and for that, making use of its Device and its AAB Authentication Application:

a) It receives the message M1 and continues with the authentication procedure of the initiated dialogue. To do so:

It verifies Party A's Identifier.

It decrypts with CCAB the CCAB(TS, CCM2, VAM2, CCM3, VAM3, DATA1, VRM1); it applies the same summary function to the same received values and obtains the Summary Value that the received VRM1 must have and if the Summary Value calculated coincides with the received one it means that the decryption has been performed correctly and the message has not been manipulated. This means that the CCAB value is the one that was used to encrypt and therefore the one that created the message and performed the encryption has been Party A, since only Party A knows this value. In addition, the integrity and confidentiality of the information received is guaranteed. Also, optionally, it will be checked that the received Timestamp TS is equal or greater than that of the last message processed and that it is within an agreed range of values.

Note 1: this way, it is clear that the originator of the message and the one who initiated the dialogue is Party A.

b) Party B, having received the M1 and verified that it comes from Party A, prepares and sends, to Party A, an M2 message, continuing with the authentication procedure of the dialogue already started. To do so:

It saves CCM2, VAM2, CCM3, VAM3 values for later use.

It composes the message (TS2, VAM2, DATA2), with the Timestamp of the time TS2 and the DATA2 to be sent, and encrypts it with CCM2.

It sends to Party A (IdA) an M2 message containing, among other possible values, the values of:

IdA; IdB; CCM2(TS2, VAM2 DATA2).

Note 2: following the reasoning of Note 1, what we do know is that the receiver of the message, if it is not Party A, will not be able to decrypt it as it does not know the CCM2 value and, therefore, will not know the data sent to Party A and the message will only have a coherent and valid response if it is indeed received by Party A.

Party A a) It receives from Party B the message M2: IdA; IdB; CCM2(TS2, VAM2, DATA2) and continues with the authentication procedure of the already started dialogue. To do so:

It verifies Party B's Identifier.

It decrypts with CCM2 the information of the M2 to obtain the VAM2 and verify its coincidence with the one sent in the M1, thus ensuring that the decryption has been correct and that the M2 is the answer to the M1 sent, since it contains the VAM2 value, which authenticates the message. As only Party B knows the CCM2 value with which the M2 message arrived encrypted, the authenticity of Party B as the originator of the message is assured and, in this way, Party A knows that it is indeed in dialogue with Party B, thus completing the mutual authentication process. As the message travels encrypted, its integrity and confidentiality is also guaranteed. The fact that the sequence of messages is fixed by the presence in the message of the pseudo-random VAMx values, and not by a fixed predetermined value that establishes an order in the sequence of messages, strengthens the security of the cipher, since most techniques used to break ciphers look for the existence of fixed values present in the ciphertext.

b) In order for Party B to know with certainty that the M2 has reached Party A and that therefore the mutual authentication process has been performed correctly, it will be necessary for Party A to send Party B an M3 confirming the reception of the M2, Party B knowing that, following the procedure of the invention, Party A will respond only if it has received the M2 message and verified that the CCM2 sent in the M1 was used for its encryption. This being so:

It composes the message (TS3, VAM3, DATA3), with the current TS3 and DATA3 to be sent, and encrypts it with CCM3.

Sends to Party B (IdB) an M3 message containing, among other possible values, the values of: IdB; IdA; CCM3(TS3, VAM3, DATA3).

In this way, when Party B receives the message, decrypts it with CCM3 and verifies the VAM3, it will be sure that Party A is the sender and that the message M2 was indeed received by Party A and this is its response, since, following the authentication procedure of the invention, Party A would not have sent this message if it had not previously received the M2 encrypted with the correct CCM2 value, and no other party could have created it, since only Party A has the CCM3 encryption key.

Thus, the mutual authentication procedure is completed from the point of view of those who have been the creators of the messages exchanged in the dialogue, Party A and Party B, and with the security of the authenticity of the data, their integrity and their confidentiality; it is authenticated, accredited, that the information sent by Party A in message M1 did reach Party B and that the information received in M2 is precisely its response to M1, as well as that M2 reached Party A and that M3 is the response to M2; so that neither of the two Parties can claim ignorance or repudiation of the operation.

In the event that the operation to be authenticated requires Party A to know that its M3 has indeed arrived at Party B, it will be necessary for Party B to send Party A a new M4 message, and for this, in this case, other pseudo-random values CCM4 and VAM4 will have been generated and transmitted at the start. And so on and so forth.

The same approach will allow a dialogue initiated by Party B and addressed to Party A to be conducted.

In all the messages, optionally, due to their interest for later auditing and management, a value that groups and differentiates all messages belonging to the same dialogue may also travel encrypted.

In all messages, optionally, due to their interest for operations and controls, the identifier of the sender of the message in the communication network supporting the dialogue and the summary value resulting from applying a summary function (hash function type SHA, Secure Hash Algorithm or similar algorithm) to the group of data that, travelling in the message, is of interest to ensure its integrity, including the IdA and IdB, may also travel encrypted.

Optionally, the Parties may have other values, in addition to the CC, shared with each of their possible interlocutors, different values for each of these possible interlocutors, and which may be used within other different operations that may be carried out between them. One possible example, among many others, could be the case of an operation that allows to store all the information that one Party wishes to share with another Party, and only with that Party, encrypted with a second value that is shared only by these two Parties. Thus, following with an example, the two Parties could share all the information exchanged between them in their dialogues, authenticated according to the procedure, having been saved (stored) after having been encrypted with the second value that they share. Only they know this encryption value and no one else will have access to this information.

In the authentication system, object of the invention, a mutual authentication is carried out between the Authentication Applications which in turn authenticates the messages that are exchanged. In the event that one of the Applications is being used by a natural person, what cannot be ensured is who is using the Authentication Application and, therefore, who is the real sender and final recipient of the messages exchanged. Initially, the fact that a user has the Application is already a first indicator that he/she is the real user. Since it is easy to steal a device with its Authentication Application installed, it is usual that the Application forces its user to provide one or more authentication factors that identify him. The most common is the CA Activation Code that the Application needs to get up and running.

In order for the authentication of the Party/person involved in the process not to depend exclusively on the knowledge of the Activation Code of the authentication application and the possession of the device with its Authentication Application (double Authentication Factor, 2FA), a new factor, physical or logical element independent of the AA, can be defined, such that this element is the one containing information without which the authentication process cannot be correctly completed. This element will be known as the Third Factor of Authentication required for the completion of an authentication operation (3FA).

In order to incorporate this 3FA into the authentication procedure described above, it shall be agreed that:

when Party B creates the M2 message to be sent to Party A (natural person), instead of sending the received VAM2 value, it shall send a 3FAVAM2 value obtained by complementing the VAM2 value with the 3FA value that Party B has for its dialogues with Party A when it wants Party A (person) to make use of the third authentication factor. The way in which VAM2 is "complemented" with 3FA can be any one of a number of ways in which the two above-mentioned values generate a single resulting value, 3FAVAM2;

when Party A (person) receives from Party B the message M2 it shall provide to its Authentication Application this 3FA value, making use of the third element it possesses, to complement the VAM2 sent in the M1 and obtain the 3FAVAM2 to be compared with the 3FAVAM2 value arriving in the M2 and thus, if they coincide, to be able to correctly treat the M2 message.

Operating in this way, the authentication procedure can only be successfully completed if the Recipient of the M2 message has a Third Factor of Authentication with all that this implies in terms of enhancing the security level of the mutual authentication process.

Optionally, in a similar way, the recipient of message M1 or M3 can also be made to need a third authentication factor in order to continue with the authentication procedure.

This mode of operation allows the authentication procedure to be used, as appropriate, in the two-factor authentication mode (2FA) or in this new mode that makes use of a third authentication factor (3FA).

Depending on the application of the Authentication Procedure, there will be other ways to apply the 3FA as long as the absence of the 3FA prevents the proper completion of the process to which it is applied.

Optionally, the described authentication procedure provides for possible simplifications.

In order to reduce the consumption of resources by the Authentication Applications, it can be agreed that M2 and successive M2 messages, used in the same dialogue between Parties A and B, travel unencrypted, thus eliminating the need for CCM2 and CCM3 values and the need for encryption and decryption of these messages.

Because of its importance in the possible use cases of the authentication procedure, there is one simplification of the authentication procedure described above that should be highlighted. This is the case where only one of the Parties (Central Party) has the capacity to dialogue with all the other Parties covered by the system supporting their dialogues, while all the others, except this one, can only dialogue with this one (Central Party).

In this case, if we assume that the Central Party is the CP, each one of them must have the values:

A—IdA,
IdCP—CCA
B—IdB,
IdCP—CCB
C—IdC,
IdCP—CCC
CP—IdCP,
IdA—CCA;
IdB—CCB;
IdC—CCC

As it can be seen, only the Central Party, CP, is the one that must have the variables that allow it to dialogue with all the other Parties, providing the advantage of not having to carry out the activity of storing and keeping updated all the Id and CC variables of the possible interlocutors of the Parties, except for the Central Party, which must have them.

In the implementation, encryption and decryption operations can make use of a symmetric AES-type encryption algorithm, which are less resource-consuming than other types of encryption, and preferably with CC encryption keys and VA authentication values of 16 Bytes (128 bytes).

These simplifications can be applied all together, at the same time, or only those that may be of interest in a particular case.

Preferred simplified authentication procedure.

It is obtained by applying all the simplifications described above to the mutual authentication procedure described above.

In it, for dialogues between A and B both Parties need to share their Identifiers, within the authentication system, IdA and IdB and the CCA value.

From now on, in this description of the Simplified Procedure and applicable generically for any communication between the Central Party (Party B) and any other Party A, they will be referred to generically as IdA, IdB and CC. Thus:

Party A—IdA,
IdB—CC;
Party B—IdB,
IdA—CC.

The tasks to be performed by Parties A and B with their Authentication Applications are:

Party A
It initiates the procedure for a dialogue with Party B, in which three messages are to be exchanged, using its Device and its AAA Authentication Application:
 It generates and stores two Pseudorandom Values, VAM2 and VAM3 to be used as Authentication Values (VAMx) in the M2 and M3 messages respectively. All these generated values will have a certain validity time that will be controlled in their usage process. The number of pseudo-random values to be generated will depend on how many messages are to be exchanged throughout the dialogue between the Parties so that there is one value to be used for each M2 message and successive M2 messages.
 It obtains the Timestamp of the time TS; it prepares the information to be sent containing, at least, the values IdA, IdB, TS, VAM2, VAM3 and DATA, where DATA will contain information to be communicated to Party B; it applies to this information a summary function (hash function type Secure Hash Algorithm or any other similar algorithm) obtaining a Summary Value of the information to be transmitted in the message M1, VRM1; it encrypts with CC, obtaining CC(TS, VAM2, VAM3, DATA, VRM1).
 It sends to Party B an M1 message containing, among other possible data: IdB; IdA; CC(TS, VAM2, VAM3, DATA, VRM1).
 Optionally, for operational and control purposes, the identifier of the sender of the message in the communication network supporting the dialogue may also travel encrypted by CC.

Party B
It continues with the procedure for a dialogue with Party A, in which three messages are to be exchanged, using its Device and its AAB Authentication Application:
a) It receives the message M1 and continues with the authentication procedure of the initiated dialogue. To do so:
 It verifies Party A's Identifier.
 It decrypts with CC the CC (TS, VAM2, VAM3, DATA, VRM1); it applies the same summary function to the same received values and obtains the Summary Value that the received VRM1 must have and if the calculated VRM1 coincides with the received one, it means that the decryption has been carried out correctly. This means that the CC value is the one that was used to encrypt and therefore the one who created the message and performed the encryption has been Party A, since only Party A knows this value. In addition, the integrity and confidentiality of the information received is guaranteed. Also, optionally, it will be checked that the received Timestamp TS is equal to or greater than that of the last message processed and that it is within an agreed range of values.

Note 1: Thus, it is clear that the originator of the message and the one who has initiated the dialogue is Party A.

b) Party B, having received M1 and verified that it comes from Party A, prepares and sends, to Party A, an M2 message, continuing with the authentication procedure of the dialogue already started. For this purpose:
 It saves the values VAM2, VAM3, for later use.
 It composes the message IdA, IdB, TS2, DATA, VAM2, with the current TS2 and DATA to be sent, and calculates its summary value VRM2 by applying a given summary function.
 It sends to Party A (IdA) an M2 message containing, among other possible values, the values of: IdA, IdB, TS2, DATA, VRM2.

Note 2: following the reasoning in Note 1, what we do know is that the receiver of the message, if it is not Party A, does not know the VAM2 value and therefore cannot recalculate the correct VRM2 and the message will only have a consistent and valid response if it is indeed received by Party A.

Party A
c) It receives from Party B the message M2 IdA; IdB; TS2, DATA, VRM2 and continues with the authentication procedure of the already started dialogue. To do so:
 It verifies Party B's Identifier.
 It recalculates the value of VRM2 taking into account the received data IdA, IdB, TS2, DATA and the VAM2 value sent in the message M1 and verifies its coincidence with the received one. If it matches, Party B is the one who calculated the received VRM2 as only Party B knows the VAM2 value. This authenticates Party B as the sender of the M2 message and also the integrity of the message received and that M2 is the response to the M1 sent since the VAM2 value has been used in it. In this way, Party A knows that it is indeed in dialogue with Party B, completing the mutual authentication process.

d) In order for Party B to know with certainty that the M2 reached Party A and that therefore the mutual authentication process has been performed correctly, it will be necessary for Party A to send Party B an M3 confirming receipt of the M2, Party B knowing that, following the procedure of the invention, Party A will only respond if it has received the M2 message and verified that the VAM2 sent in the M1 was used to obtain its summary value VRM2. This being so:
 It composes the message IdB, IdA, TS3, DATA, VAM3, with the current TS3 and the DATA to send, and calculates its summary function VRM3.

It sends to Party B (IdB) an M3 message containing, among other possible values, the of: IdB; IdA; TS3, DATA, VRM3.

In this way when Party B receives the message it will check that the received MRV3 matches the calculated one using the received values together with the VAM3 it received in the M1 and, if the received MRV3 matches the calculated one, Party B will be sure that it is Party A its sender as only Party A knows the VAM3, Party B will be sure that Party A is its sender as only Party B knows the VAM3 and also knows that the M2 message was indeed received by Party A and this is its response, since, following the authentication procedure of the invention, Party A would not have sent this message if it had not previously received the correct M2. The integrity of the received M3 message is also assured.

Thus, the mutual authentication procedure is completed from the point of view of those who have been the creators of the messages exchanged in the dialogue, Party A and Party B, and with the security of the authenticity of the data and its integrity. And it is authenticated, accredited, that the information sent by Party A in message M1 did reach Party B and that the information received in M2 is precisely its response to M1, as well as that M2 reached Party A and that M3 is the response to M2; so that neither of the two Parties can claim ignorance or repudiation of the operation.

In the case where the operation to be authenticated requires Party A to know that its M3 has indeed reached Party B, it will be necessary for Party B to send Party A a new M4 message and for this purpose, in this case, another pseudo-random value VAM4 will have been generated and transmitted at the beginning. And so on and so forth.

The same approach will allow a dialogue initiated by Party B and addressed to Party A to be conducted.

In all messages, optionally, due to their interest for later auditing and management, a value that groups and differentiates all messages belonging to the same dialogue may also travel encrypted.

In all messages, optionally, for operational and control purposes, the identifier of the sender of the message in the communication network supporting the dialogue may also travel encrypted in all messages.

Because of its importance in eliminating the risk of using the same fixed CCAB key for the encryption and decryption of the first M1 message exchanged between the parties to the authenticated dialogue, the following details a way of conducting the dialogue which ensures that the key value, used for the encryption and decryption of the M1 message, is different for a dialogue that takes place after a dialogue in which parties A and B have successfully exchanged encrypted messages M1 and M2.

Thus, the fixed key CC becomes a one-time key, OTP (One Time Password), and then all encryption keys used by the system are one-time keys. The main advantage is that using OTP keys prevents REPLAY attacks, also called replay or re-injection attacks, which is a cyber-attack in which an entity intercepts and then repeats a data transmission with malicious intent. Another advantage is that it makes the system more resistant against brute force attacks, since each time the key is changed, previous attempts to break the previous encryption key are useless and have to be started again.

To this end:

at the time a new Party is integrated into the authentication system, that Party will share an initial value of the CC encryption key with each of the other Parties with which it wishes to be able to exchange messages, being different for each pair of Parties;

the Authentication Application of Party B for verifying that the message M1 comes from Party A decrypts the message with the value CCAB and if this value cannot verify its authenticity, and the previous dialogue ended without Party A receiving M2, it decrypts it with the value used for the last processed and verified message which will be stored in a variable CCUUAB;

the Authentication Application of Party B, after checking that the M1 received comes from Party A:

the value used in the encryption and decryption of that M1 is saved in a variable CCUUAB;

it generates a new value for the CCAB encryption key to be used in the next M1 received from Party A;

it communicates to Party A the new CCAB value by means of the encrypted message M2.

the Application of Party A, after checking that the received M2 message comes from Party B, stores in CCAB the value of the new encryption key received in M2 to be used in the next M1 to be sent to Party B.

By operating in this manner, the value of the CCAB will be different each time the Parties successfully exchange M1 and M2 messages.

Some distinguishing features of the system's implementation are described below:

Parties exchanging messages in a dialogue share an encryption key that is only used for the encryption and decryption of the first message exchanged, thus facilitating its concealment by minimizing its time of use and possible exposure. There are other systems that apply the same encryption key to all messages exchanged in their dialogue, which considerably increases the time of possible exposure and increases the risk of the key becoming known to an intruder.

The message encryption and authentication system applies an encryption protocol and algorithm which, using a fixed key and pseudo-random values, encrypts and authenticates the messages sent and received by the Parties integrated in the System, which implements the System, in such a way as to achieve mutual authentication of the Parties. There is some encryption and authentication system in which the random value, to be used in the encryption of the messages of the dialogue to be initiated, is sent to the Recipient encrypted with a shared fixed key, but the message in which it is sent is not validated by a mutual authentication process, with the problems that may arise from this, since the arrival of the message to its true recipient is not verified, nor is the authenticity of the sender.

The message encryption and authentication system used in the authentication system uses an advanced encryption algorithm (AES 128 or 256 type), so that if someone were to perform a brute force attack to try to break the encryption, with current technology, the estimates of time and resources required make it unfeasible and uneconomical.

The fact that the sequence of messages exchanged in the procedure is fixed by the presence in the message of the pseudo-random VAMx values, and not by a fixed predetermined value that establishes an order in the sequence of messages, strengthens the security of the cipher since most techniques used to break ciphers look for the existence of fixed values present in the ciphertext.

The message encryption and authentication system used in the authentication system requires only an encryption key, CC, which is available in the authentication applications of the participants, together with pseudorandom values that are generated on the fly. Comparing this approach with other possible authentication systems that use stored OTP keys for the encryption of their messages, it is evident that the necessary availability of storage resources is avoided and the operation of the system and its maintenance is greatly simplified in that the processes of reloading keys already used and the punctual synchronization necessary in this type of system are eliminated.

The implementation of the system can be done in such a way that the CC key value and/or the generation of the pseudorandom value and/or its encryption is done on an external device which is only connected to the Application in order to provide these values. If someone copies the Application, this copy does not have such a device and will not be able to function.

In the implementation of the authentication procedure, the authentication system can use a third factor authentication (3FA) of the user/party based on the use of an Element that stores a value that complements the authentication value and that must be provided by the user/party for the mutual authentication to be completed correctly. In this case, if the authentication device, together with its authentication application, is copied or stolen, they will not be able to perform any authentication operation as they would be missing this Element.

When, in the implementation of the authentication system in the Application, user intervention is necessary, this intervention is minimized by limiting it to activating the authentication application—normally with the user's fingerprint or by bringing (with NFC (Near Field Communication)) a card close to the device, scanning a QR, connecting a microcontroller, etc.—and, with a click, authorizing or rejecting the operation. This avoids the hassles and errors of any other type of intervention that in most existing authentication systems require the memorization of a PIN and the cumbersome typing of data into your device, which is the source of many errors, wasted time and expense.

The authentication system identifies the User (Party) and authenticates him and the messages exchanged against the other party to the dialogue and normally requires from the user 2 Factors of Authentication (2FA), the activation code and the Application installed on his device.

The authentication system, implemented and executed under certain conditions, which ensure that only the authentication application can access the CC value, facilitates message authentication between devices carried out automatically, without manual intervention, thus extending the scope of application of the system to any device that needs to send an authenticated and encrypted message to another device previously paired with it by means of the authentication system.

The mutual authentication of the parties, which is applied in the implementation of the authentication procedure, allows transactions to be carried out without fear of a phishing or pharming problem, as it does not correctly terminate a transaction if the parties have not first mutually identified each other.

The fact that in the authentication system the messages exchanged, M2 and successive, travel encrypted and/or authenticated by a random one-time key means that the messages are travelling each time through a different logical communication channel, with all that this implies in terms of avoiding possible Man In The Middle attacks.

In the implementation of the authentication system, it is possible to make it possible for an AA1 application of Party A (running on a Secure Server or making use of 2FA authentication for its activation) to securely send an Authenticated Request requesting the execution of an Operation to any of the Operational Applications (OAs) to which AA2 application, of Party B, relates, within the Computer System that supports said AA2.

In the implementation of the authentication system, the mutual authentication of the parties together with the authentication of the exchanged messages allows to confirm, sign and avoid repudiation of any kind of operation performed between the Parties. For example, a transfer request in a Financial Institution or the execution of a command within a Process Control System in Industry or in the Internet of Things.

Any of the above differentiating features apply to the case where the encryption key used to encrypt and decrypt the message M1, which is exchanged between the Parties in dialogue, is different for each new successfully completed dialogue. This feature of the system brings an important improvement in that the validity time of the same encryption key CC, stored in the Authentication Applications, is reduced to the time between two dialogues held by the parties. Thus, the fixed CC key becomes a one-time key (OTP type key) avoiding replay attacks and improving the resistance against brute force attacks used to get the encryption key.

Some examples of application cases of the system are described below.

System for the mutual multi-factor authentication of Parties that want to conduct a Secure Dialogue with each other with an exchange of encrypted and authenticated messages that can be made available to them exclusively encrypted with a second value known only to them.

System for the authentication of the Parties involved in the request of a transaction and its subsequent authorization for its execution, avoiding its repudiation. As examples, the transaction can range from a request for access to a web Portal to the authentication and confirmation of a transaction requested on a web Portal or the authorization and confirmation of a transaction requested by means of a device operating with identification and/or payment cards.

System for the Exchange of Encrypted and Authenticated Messages between Parties using the System that allows them to send/receive encrypted and authenticated messages to/from any other Party using the System by using a Trusted Third Party with which the two Parties involved communicate in the Exchange of Messages.

System in which Parties A and B are two Servers, integrated in a communication network, in which the Communication Application of Party A can receive messages from the Communication Application of Party B, and vice versa, where such messages will be characterized by being encrypted and authenticated facilitating the creation of a Secure Communication Network.

Valid system for the authentication of messages that can be exchanged between Sensor Controllers and their Industrial Process Control System and between the latter and the Users Responsible for their regulation by means of the authentication of the commands sent by the user to the system for their execution. The same applies to messages exchanged between Sensors and their Controllers. This also applies to the field of Internet of Things (I) Systems.

Finally, it is worth mentioning that, in the invention authentication procedure, a Party is understood as an Entity, person or physical or logical machine, that dialogues with another Entity due to their mutual interest in achieving the resolution of the same operation in order to obtain a specific result in the field of their activity. These Entities shall have the capacity to carry out the activities to be performed by the Parties in the described procedure, or equivalent activities, provided that they have the same effects.

In summary, the authentication system of the invention contemplates several ways of carrying out mutual authentication of the communicators, among them:

i/—System with automatically initiated dialogue between AAA and AAB:
It is carried out, following the encryption and authentication system object of the invention, by means of a dialogue, which is automatically initiated between the two authentication applications AAA and AAB when a predetermined event arrives to AAA (e.g. DATA arrives to AAB). The Authentication Applications are previously active and have the CCAB encryption key that they share.

ii/System with dialogue initiated by a Party A (natural person) with two authentication factors, the AAA and the CA:
It is carried out following the encryption and authentication system of the invention by means of a dialogue between the two authentication applications AAA and AAB which is initiated by Party A (natural person) by activating the AAA application with its activation code CA. AAB is already active and has the CCAB which it shares with AAA.

iii/System with dialogue initiated by a Party A (person) having three authentication factors, the AAA, the CA and the 3FA:
It is carried out following the encryption and authentication system of the invention by means of a dialogue between the two authentication applications AAA and AAB, which is initiated by Party A (natural person) by activating the AAA application with its activation code CA. Party A must provide the AAA with the third authentication factor 3FA so that the AAA can validate the M2 message sent by the AAB. The AAB is already active and has the CCAB which it shares with AAA.

iv/Simplified system with automatically initiated dialogue between AAA and AAB: same as case i but applying the simplified encryption and authentication system.

v/Simplified system with dialogue initiated by Party A (person) with two factors of authentication, the AAA and the CA: Same as case ii but applying the simplified system of encryption and authentication.

vi/Simplified system with dialogue initiated by Party A (person) with three factors of authentication, AAA, CA and 3FA: Same as case iii but applying the simplified system of encryption and authentication.

vii/—Single-use key system with Automatic Dialogue setting the CCAB for the next Dialogue:
Same as case i but applying the one-time key encryption and authentication system where the encryption key CCAB used in a dialogue has been created in the previous dialogue where the parties have exchanged messages M1 and M2.

viii/System with single-use keys with Dialogue initiated by Party A (person) with two factors of authentication, the AAA and the CA:
Same as case ii but applying the encryption and authentication system with keys of a single use.

ix/—Single use key system with Party A (person) initiated Dialogue with three factors of authentication, the AAA, the CA and the 3FA:
Same as case iii but applying the encryption and authentication system with keys of a single use.

List of Acronyms Used

Authentication Application (AA)
Authentication Application party A (AAA)
Authentication Application party B (AAB)
Identifier (Id)
Encryption Key (CC)
Activation Code (CA)
Message (M)
Timestamp of the moment (TS)
Authentication Values (VA)
Summary Value (VR)
Factor of Authentication, (FA)

DESCRIPTION OF DRAWINGS

In order to complement the description given and to assist in a better understanding of the features of the invention, this description is accompanied, as an integral part thereof, by a set of drawings in which the following has been illustrated in an illustrative and non-limiting manner.

PREFERRED EMBODIMENT OF THE INVENTION

In view of the aforementioned figures, and in accordance with the numbering adopted, it is possible to observe in them a representation and various non-limiting schemes of realization of the system of the invention and which, therefore, do not exclude any other that may be given, of similar characteristics in which AA1 and AA2 exchange messages according to the authentication system described, which allows completing their mutual authentication and a possible confirmation of an operation carried out between them.

It is worth mentioning that, in order to simplify the explanation of the diagrams of the figures, in addition to the acronyms already mentioned in previous paragraphs, the following abbreviations will be used from now on:

D1A Operating device from which a user is operating
DO Transaction Data
AA1 Authentication Application of the First Party
AA2 Authentication Application of the Second Party
AO Application of Party B that supports the operation being performed by the user or Party A.

Figure 1:
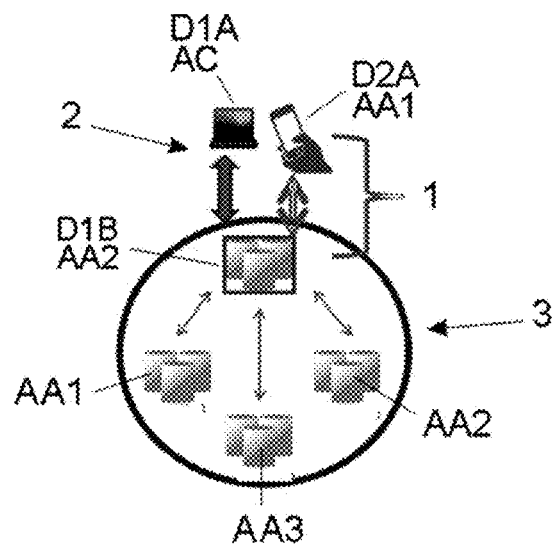
FIG. 1 shows a schematic representation of the main elements involved in the authentication system covered by the invention and the relationship of how the authentication system interacts with the company's computer system that manages the operational applications to carry it out.

Thus, FIG. 1 shows, schematically, a representation of the main elements comprising the authentication system (1) with which the procedure of the invention is carried out, where on the one hand, referenced as (2), are shown the devices and IT tools used by the users requesting operations or party A, namely at least a D1A and AO, as well as a D2A and AA1, and on the other hand, referenced as (3), are shown the tools of the company's IT system, party B, namely D1B and AA2 and the operating applications AP1, AP2, AP3. Looking at FIG. 2, it can be seen how the operational scheme and message flow of the authentication system, when the operation data requested by Party A from a device D1A is captured by AA1 automatically (with a QR, via NFC, or any other possible means of communication) coming from D1A, comprises the following steps:

a) The D1A provides the AO with the DOs to be authenticated and confirmed. And the AO prepares the DOs to be sent to D1A and AA2.
b) The AO sends to D1A the DOs in the appropriate format to be captured by AA1.
c) The AO sends the DOs to AA2. AA2 stores the DOs pending authentication.
d) The AA1 captures the DOs from D1A. AA1 presents the DOs to the user and waits for confirmation. If confirmed, it creates, according to the simplified authentication procedure, the M1 message and sends it to AA2.
e) The AA2 decrypts, according to the simplified authentication procedure, the M1 and verifies the DOs with those it has on hold. If they are correct, it creates, according to the simplified authentication procedure, and sends to AA1 the M2 message.
f) The AA2 communicates the result to the AO.
g) The AA1 processes the M2 according to the simplified authentication procedure, and presents the data to the User, confirming that the authentication was successful.
h) The AO communicates the result to D1A.

Figure 3:
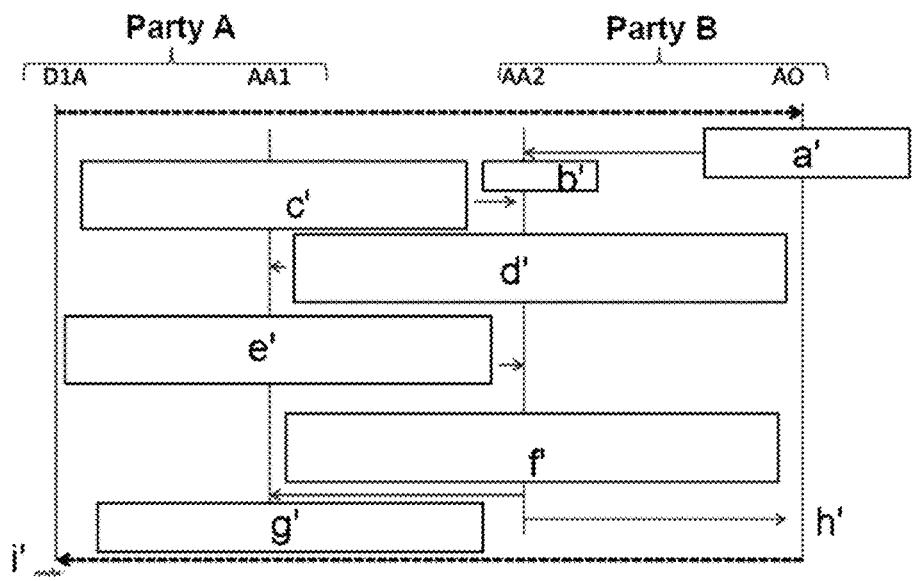
FIG. 3.—Shows a diagram of the steps comprising the operational scheme and message flow of the authentication system when AA1 initiates the authentication of a transaction that Party A requested to an Operational Application AO from its device D1A.

Looking at FIG. 3, the operational scheme and message flow of the authentication system, when AA1 initiates the authentication of an operation that Party A requested to an Operational Application AO from its device D1A, comprises the following steps:

a') The D1A provides the AO with the DOs to authenticate and confirm. The AO prepares the DOs and sends them to AA2.
b') The AA2 stores the DOs, waiting for the authentication request to arrive from AA1.
c') The AA1 sends an encrypted message M1 to AA2 to initiate the authentication of an operation that has been requested by the user from D1A.
d') The AA2 verifies that it comes from AA1 and that for that user there is an operation waiting for authentication. It creates the M2 message with the DOs and sends it to AA1.
e') The AA1 decrypts the M2, verifies that it comes from AA2 and presents it to the user for authorization. It creates the M3 message with the DOs and the result of the authorisation and sends it to AA2.
f') The AA2 decrypts the M3, verifies that it comes from AA1, checks that the DOs it has match the DOs received and communicates the result to the AO and creates an M4 message which it sends to AA1 to communicate the result.
g') The AA1 processes the M4 and presents the result of the operation to the user.
h') The AA2 communicates the result to AO.
i') The AO communicates the result to D1A.

Figure 4:
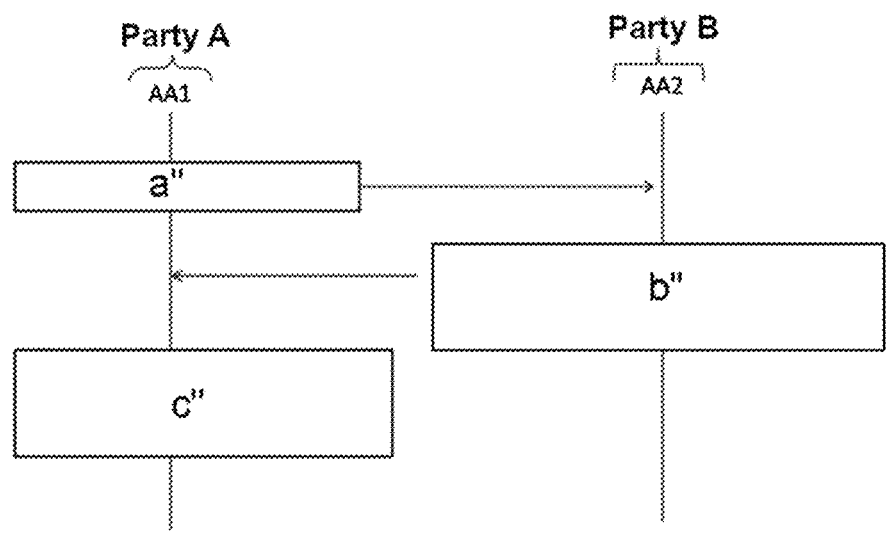
FIG. 4 shows a diagram of the steps comprising the operational scheme and message flow of an authentication system for a mutual authentication between two Parties that authenticates a message sent by Party A to Party B and Party B confirms its receipt.

Looking at FIG. 4, it can be seen that the operational scheme and message flow of the authentication system for a mutual authentication between two Parties that authenticates a message sent by Party A to Party B and Party B acknowledges its receipt comprises:

a") The AA1 sends an encrypted message M1 to AA2 and initiates the mutual authentication operation.
b") The AA2 verifies, with the decryption procedure, that the M1 comes from AA1, thus AA1 is authenticated against AA2 as the sender of the message and also the content of the message. AA2 creates the M2 message and sends it to AA1 to complete the mutual authentication process and confirm that the M1 has reached AA1.
c") The AA1 decrypts the M2 and verifies that it is the response provided by AA2 to the M1 message, which authenticates AA2 to AA1 and closes the mutual authentication process for the performed dialogue. AA1 also knows that AA2 received the M1.

Figure 5:
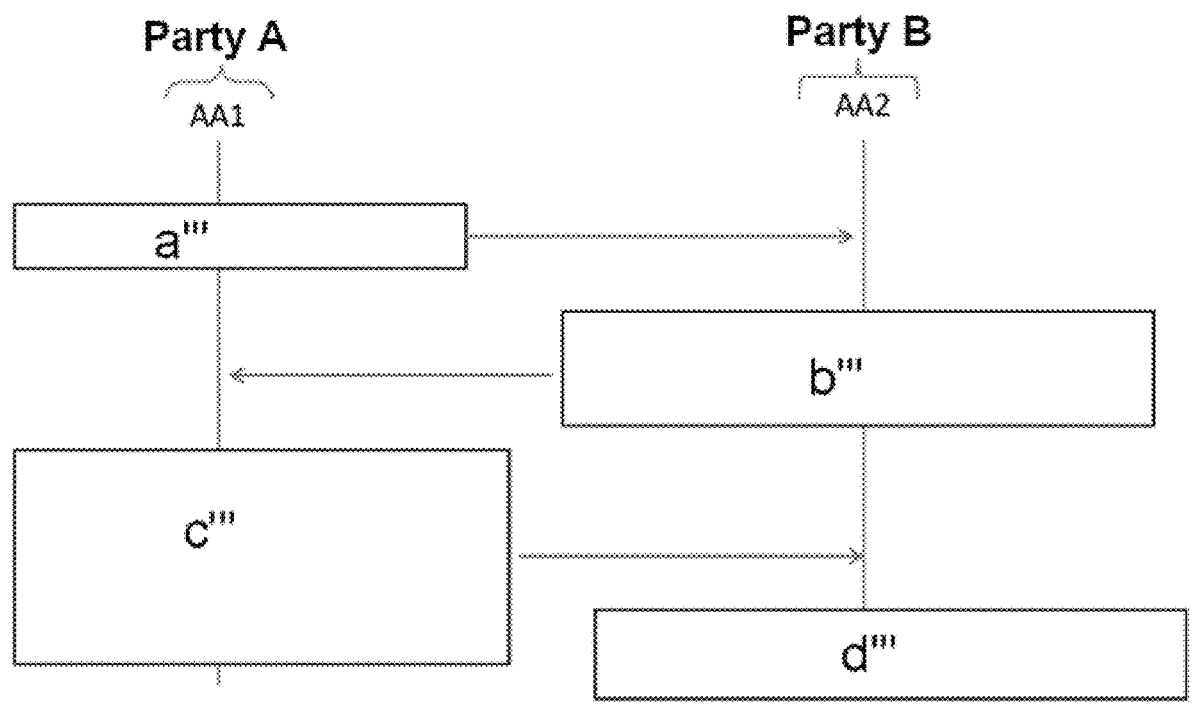
FIG. 5.—Shows a diagram of the steps comprising the message flow authentication system for a mutually confirmed authentication between two Parties.

And, looking at FIG. 5 which shows that the steps comprising the message flow of the authentication system for a mutually confirmed authentication between two Parties are:

a'") The AA1 sends an encrypted message M1 to AA2 and initiates the mutual authentication operation.
b'") The AA2 verifies, according to the procedure, that the M1 comes from AA1, thus AA1 is authenticated against AA2 as the sender of the message. AA2 creates the M2 message and sends it to AA1 to complete the mutual authentication process and confirm that the M1 arrived.
c'") The AA1 handles the M2 and checks that it is the response provided by AA2 to the M1 message, thus AA2 is now authenticated against AA1 and the mutual authentication process for the performed dialogue is closed. AA1 also knows that AA2 received the M1. To let Party B know that the mutual authentication has been successfully completed, Party A sends it an M3 message.
d'") The AA2 verifies, according to the procedure, that the M3 comes from AA1 and thus knows that the mutual authentication process has been successfully completed and that the M2 has reached AA1.

In the following, different examples of the mode of use of the authentication system according to the invention are described.

Thus, as a first example of Mode of use of the authentication and encryption system, object of the invention, we will see how it is applied to the case in which a user of the authentication system, Party A, wants to transmit an encrypted message to another user of the authentication system, Party B, making sure that said message has certainly reached the recipient user.

Characteristics:

Party A and Party B:
are unequivocally identified, by their IdA and IbB, within the message authentication system supported by the communication network that allows them to exchange such messages, the parties being connected by one or more communication channels that allow them to exchange such messages;
have their Authentication Application, with all its components, in a device that ensures that: the CC encryption key can only be known and used by it; and that encryption and decryption operations are also performed securely. For this purpose, Hardware Security Module (HSM) type means can be used.

For dialogues between A and B they need, in their authentication applications:
that the parties activate their authentication applications by providing their activation codes using the means provided;
share the CC value;
a generator of Pseudo-Random Values, to be used in the Mx messages;
an encryption algorithm, which it shares with the rest of the System Parties, that allows them to encrypt and decrypt the messages that are sent/received.

Operation:

Party A

It initiates the procedure for a dialogue with Party B, in which two messages are to be exchanged, using its Device and its AAA Authentication Application:
It generates and saves two Pseudorandom Values, CCM2, VAM2 to be used as Encryption Key and Authentication Value in the M2 message. These generated values shall have a certain validity time which shall be controlled in the process of their use;
It obtains the Timestamp of the time TS; it prepares the information to be sent containing, at least, the values IdB, IdA, TS, CCM2, VAM2, and DATA, where DATA will contain the information to be communicated to Party B; it applies to this information a hash function (Secure Hash Algorithm hash function or any other similar algorithm) obtaining a Summary Value of the information to be transmitted in the message M1, VRM1; its encrypts with CC, obtaining CC(TS, CCM2, VAM2, DATA, VRM1).
It sends to Party B an M1 message containing, among other possible data: IdB; IdA; CC(TS, CCM2, VAM2, DATA, VRM1).

Optionally, for operational and control purposes, the identifier of the sender of the message in the communication network supporting the dialogue may also travel encrypted by CC.

Party B

It continues with the procedure for a dialogue with Party A, and for this, making use of his Device and his AAB Authentication Application:
It receives the message M1 and continues with the authentication procedure of the initiated dialogue. To do so:
It verifies Party A's Identifier.
It decrypts, with CC that it shares with Party A, the CC (TS, CCM2, VAM2, DATA, VRM1); applying the same summary function to the same received values, it obtains the Summary Value that the received VRM1 must have and if it coincides with the received one, it means that the decryption has been carried out correctly. This means that the CC value is the one that was used to encrypt and therefore the one who created the message and performed the encryption has been Party A, since only Party A knows this value. In addition, the integrity and confidentiality of the information received is guaranteed. Also, optionally, it will be checked that the received Timestamp TS is equal to or greater than that of the last message processed and that it is within an agreed range of values.

Party B, having received the M1 and verified that it comes from Party A, prepares and sends, to Party A, an M2 message to inform Party A that it has received the M1. For this purpose:
It composes the message (TS2, VAM2, DATA), with the current TS2 and the confirmation DATA to be sent, and encrypts it with CCM2.
It sends to Party A (IdA) an M2 message containing, among other possible values, the values of: IdA; IdB; CCM2(TS2, VAM2, DATA).

Party A

It receives from Party B the message M2: IdA; IdB; CCM2(TS2, VAM2 DATA) and continues with the authentication procedure of the already started dialogue. To do so:
It verifies Party B's Identifier.
It decrypts, with CCM2 sent to Party B in message M1, the information of M2 to obtain the VAM2 and verify its coincidence with that sent in M1, thus ensuring that the decryption has been correct and that M2 is the response to the M1 sent, since it contains the VAM2 value, which authenticates the message. As only Party B knows the CCM2 value with which the M2 message arrived encrypted, the authenticity of Party B as the originator of the M2 message is assured and, in this way, Party A knows that it is indeed in dialogue with Party B, thus completing the mutual authentication process and confirming that the M1 message was received by Party B and that it cannot subsequently claim ignorance of it. As the message travels encrypted, its integrity and confidentiality is also guaranteed.

By operating in this way, the Parties have transmitted encrypted information to each other, which is known only to them, with the sender ensuring that it has reached the correct recipient (only Party B can have generated the M2 received) and the recipient ensuring who the actual sender was (only Party A can have generated the M1 received).

A schematic of this operation and message flow is shown in FIG. 4.

An actual application of the above case would be where an e-mail server of party A sends a certified message with acknowledgement of receipt to another e-mail server of party B. By operating in this way, party A is assured that the information in the e-mail has reached party B only. By operating in this way, party A is assured that the information in the mail has reached party B only, and party B in turn is assured that the information has come from party A. In this way, it is possible to avoid receiving mails whose real sender is impersonating a party and is taking advantage of it to transmit false information in order to commit fraud. An example of this type of fraud is the Business Email Compromise (BEC) or MAN-IN-THE-EMAIL scams.

As a second example of Mode of use of the authentication and encryption system, object of the invention, it is now applied to the execution of an operation requested by Party A to Party B, operation in which the mutual authentication of the Parties and the confirmation of the request by the requesting Party is necessary prior to the execution of such operation. A peculiarity of the operation is the fact that the data of the operation to be executed are received by the authentication application AA1 by means of a communication between the devices D1A and D2A (supported by AA1) of Party A.

Characteristics

The embodiment makes use of the described simplified authentication procedure. Therefore, only the Central Party (Party B) can dialogue with all other Parties (Party A), which are integrated in the authentication system supporting the authentication procedure, while they can only dialogue with the Central Party.

The authentication procedure will only work correctly in a Party A specific AA authentication application and with a given CA activation code. Thus, even if someone copies the AA, he/she encounters the problem of not knowing the CA.

If the Central Party is called Party B and the rest of the Parties are generically called Party A, the characteristics to be highlighted in this authenticated dialogue according to the authentication system are:

- the parties, Party A and Party B, are unequivocally identified to each other within the authentication system by a first and second identifier;
- Party A has at least a first physical or logical device (D1A) and a second physical or logical device (D2A) in which a first authentication application (AA1) resides;
- the first device of the first part D1A is most often a PC, (although it can also be a mobile phone, ATM, physical or logical Point-of-Sale Terminal, or any other device, physical or logical, with equivalent capabilities), which can request transactions from a computer system and assist in their execution on behalf of Party A.
- the second device of the first part D2A will normally be a smart mobile phone but can also be any other device, physical or logical, with equivalent capabilities, on which the AA1 authentication application software can run;
- to activate such first authentication application AA1 Party A will have to key in a CA Activation Code or make use of a means (Party A's fingerprint, an Access Card NFC-type or with a QR code, a microcontroller, or any other similar means) which will provide AA1 with the CA Activation Code;
- Party B has a physical or logical device (D1B) on which resides a second authentication application (AA2), unequivocally related, within the authentication system, to the first authentication application AA1. This AA2 is active and running in a secure environment with the necessary security measures to be able to believe that only Party B can have access to the AA2 application and its data.
- said AA2 is part of Party B's computer system and can interact with the operational applications (AO) supported by said computer system, with which Party A, from its first device (D1A), can perform operations relating to the operational activity of Party B's computer system. An illustrative representation can be seen in FIG. 1;
- such AA2 may relate to as many Party A authentication applications as there are users in the Party B computer system;
- these first and second applications, AA1 and AA2, each have a unique identifier within the authentication system, IdA and IdB respectively;
- The first and the second application share the same CC encryption key which they will use throughout the mutual authentication procedure;
- This first AA1 application has a pseudo-random value generator algorithm;
- the said first and second applications, AA1 and AA2, each have the same AES 128 encryption algorithm, or any other with similar characteristics, for their encryption/decryption operations;
- the AA2 shall have as many different CC Encryption key values as there are Party A authentication applications related to it;
- the devices of such Party A and Party B are communicating over one or more different physical or logical communication channels;
- optionally, all messages exchanged between Parties A and B are stored by the authentication system in a file for later use as a system activity log (LOG) file.

Operation

Party A through its first device D1A requests the execution of an operation from one of operational applications (AO) of Party B;

the AO operating application receives from the device of Party A, D1A, the transaction request with the DO transaction data. This request with its DO data shall be authenticated and authorized by Party A from its Authentication Application due to the lack of security of the channel through which the request has been received and the need for authentication/confirmation required for the execution of the operation;

the operational application AO prepares the received OD transaction data and sends it to the authentication application of Party B, AA2, which receives it and leaves it waiting to be authenticated by Party A;

the AO application takes the received DO operation data and formats it by adapting it to the medium in which it will later be read by the AA1 from the D1A (reading a QR, transmitting via NFC, . . . ) and forwards it to the D1A device.

optionally, it can be AA2 itself that is in charge of this formatting of the data that through the AO sends it to D1A.

Party A activates its AA1 authentication application by providing the CA activation code;

Party A making use of a possible communication between D1A and D2A (e.g. by scanning with its AA1, supported by the D2A, a QR code that the AO presents on its web page in the D1A, or by communicating via NFC the AA1 with the D1A, or any other possible form of communication between the AA1 and the D1A). The AA1 receives in its AA1 the OD data of the operation to be authenticated and confirmed, and presents them on screen to the user (Party A) for confirmation as data of the operation to be carried out. If Party A confirms the data, its authentication application AA1 sends to Party B's authentication application a first encrypted message M1, according to the simplified authentication procedure, in which the data of the transaction, requested and confirmed by Party A, which Party B has yet to authenticate, are already encrypted;

the authentication application of Party B, AA2, receives this first message M1 encrypted according to the authentication procedure and accesses the pending operations to be authenticated to check that Party A has a pending operation to be authenticated and, if correct, decrypts the message according to the authentication procedure, and if among the decrypted data is the correct VRM1, checked against its recalculated value, it will be because the message comes from the authentication application of Party A as it is the only one that can have encrypted it as received, thus Party A is authenticated as the originator of the message against Party B, as well as the message and its content. The AA2 verifies that the transaction data received coincide with those of the transaction pending authentication and, if so, authenticates and confirms the transaction by communicating it to the AO. The AO, via device D1A, shall inform Party A of this confirmation.

Party B sends an M2 message to AA1 informing it of the result of the authentication operation it requested in its M1 message. For this purpose, the authentication application of Party B constructs a second M2 encrypted message, according to the simplified authentication procedure, containing the operation data together with the result of the confirmation and sends it to authentication application AA1 of Party A;

the authentication application of Party A receives the M2 encrypted message, processes it according to the simplified authentication procedure, and verifies that VAM2 is the value used for the calculation of VRM2, thus authenticating Party B as the originator of the message vis-à-vis Party A, as it is the only one together with Party A that knows this VAM2 value, and the fact that this M2 is the response to the sent M1, thus ensuring that its authentication request has been received by Party B and has been correctly processed.

Figure 2:
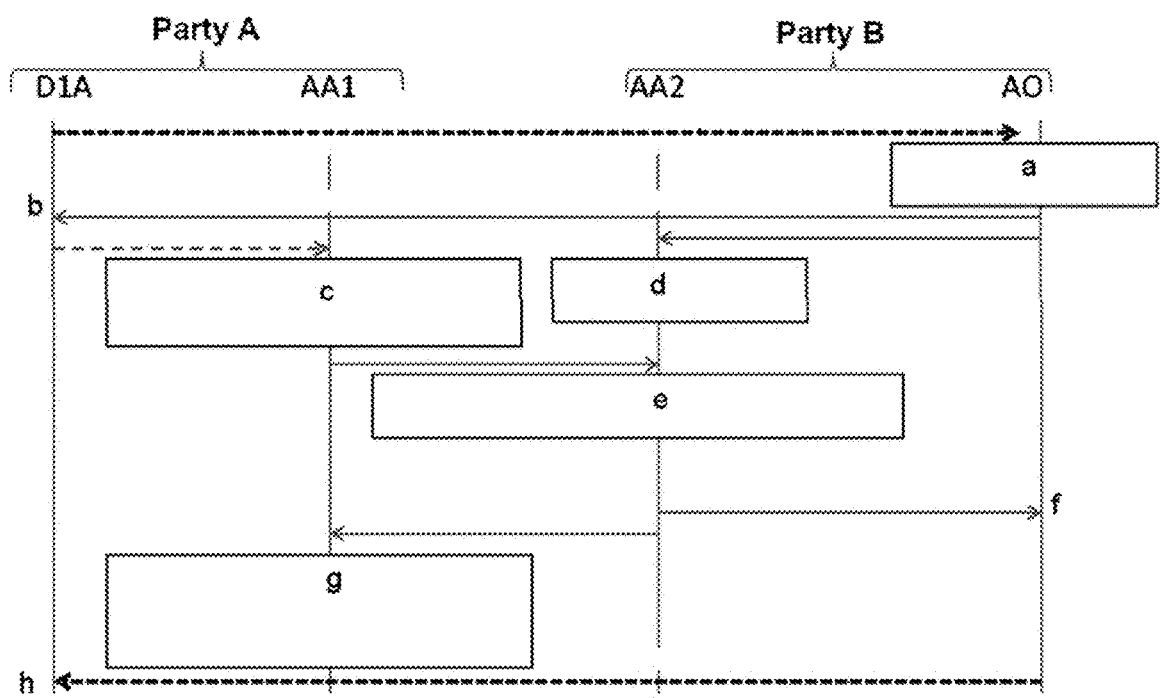
FIG. 2.—Shows a diagram of the steps comprising the operational scheme and flow messages authentication system when the data of the operation performed by Party A from a D1A device are captured by AA1 automatically (with a QR, via NFC, or any other possible means of communication) coming from D1A.

A schematic of this operation and message flow is shown in FIG. 2.

An actual application of this way of operating is the case of a payment made with a mobile phone at an NFC terminal. Here the D1A is the NFC payment terminal; the AO is the bank's application that processes the payments made on that payment terminal; the DOs are the payment transaction data; AA2 is the central authentication server that is part of the bank's computer system; AA1 is the NFC payment application supported by the user's mobile phone, D2A. In this case, operating as described, the bank, through its central authentication server (party B), knows that the message M1 with the payment details to be made was sent by the user's application (party A) and the user, on receiving the message M2, knows that the information that arrives comes from the bank's central authentication server (party B) as only they know the decryption key CC used to encrypt the message M1. In addition, the central authentication server knows that the payment data that arrived encrypted in message M1 are those that the user has validated with the application on his mobile phone so that they are the correct payment data, and if they do not match those that the SCA received from the operational application of the AO payment, there has been an interception and manipulation of the data sent from the D1A to the AO (possible Man In The Middle type fraud attempt) and they must be rejected, thus avoiding fraud.

Finally, a preferred embodiment is described. Mode in which Party A requests the execution of an operation to Party B and, applying the authentication system subject of the invention, performs a mutual authentication of the two Parties and authenticates and confirms the operation to be executed.

Characteristics

The preferred embodiment makes use of the described simplified authentication procedure in which simplifications 2 and 3 are applied. Thus: only the Central Party can dialogue with all Parties A, generic name for each of the Parties that can dialogue with the Central Party (Party B), and the Parties A can only dialogue with the Central Party; and the encryption algorithm to be used will be AES.

The authentication system will only work correctly in a specific AA application of each Party A and with a specific CA activation code, since the generation of the CC encryption key will make use of the CA of specific variables of the AA. Thus, even if someone copies the AA, he/she is faced with the problem of not knowing the CA and, therefore, the lack of the CC value necessary to be able to operate with it.

If the Central Party is called Party B and the rest of the Parties are generically called Party A, the characteristics to be highlighted in this authenticated dialogue according to the authentication system are:

the parties, Party A and Party B, are unequivocally identified to each other, and to the authentication system, by means of a first and second identifier;

Party A has at least a first physical or logical device (D1A) and a second physical or logical device (D2A) in which a first authentication application (AA1) resides;

the first device of the first part D1A is most often a PC, (although it can also be a mobile phone, ATM, physical or logical Point-of-Sale Terminal, IoT control panel, or any other device, physical or logical, with equivalent capabilities), which can request transactions from a computer system and assist in their execution on behalf of Party A.

the second device of the first part D2A will normally be a smart phone, but can also be any other device, physical or logical, with equivalent capabilities, on which the AA1 authentication application software can run;

to activate such first authentication application AA1 Party A will have to key in a CA Activation Code or make use of a means (Party A's fingerprint, an NFC or QR Code Access Card, or any other similar means) which will provide AA1 with the CA Activation Code;

Party B has a physical or logical device (D1B) on which resides a second authentication application (AA2), unequivocally related, within the authentication system, to the first authentication application AA1. This AA2 is active and running in a secure environment with the necessary security measures to be able to assume that only Party B can have access to the AA2 application and its data;

Party B has operational applications (AO), supported by its computer system, with which Party A, from its first device (D1A), can perform operations relating to the operational activity of Party B's computer system;

said second authentication application AA2, of Party B, is part of the computer system and is related to its operational applications AO (FIG. 1);

said second authentication application of Party B can relate to as many Party A authentication applications as there are users in the Party B computer system;

said first and second application, AA1 and AA2, each have a unique identifier within the authentication system, IdA and IdB respectively;

said first and the second application share the same CC encryption key which they will use throughout the mutual authentication procedure;

said first application, AA1, has a pseudo-random number generator algorithm;

said first and second application, AA1 and AA2, each have the same AES 128 encryption algorithm, or any other with similar characteristics, for their encryption/decryption operations;

the AA2 will have as many different CC Encryption key values as there are Party A authentication applications related to it;

the devices of said Party A and Party B are communicating over one or more different physical or logical communication channels;

optionally, all the messages exchanged between Parties A and B are stored by the authentication system in a file for later use as a system activity log (LOG) file.

Operation

Party A through its first device D1A requests the execution of an operation from one of Party B's operational applications (AO);

the operational application AO receives from the device of Party A, D1A, the transaction request with the transaction data DO which shall be authenticated and authorized by Party A from its Authentication Application AA1 due to the lack of security of the channel through which the request has been received and the need for confirmation required for the execution of the transaction;

the operational application AO prepares the received OD transaction data and sends it to the authentication application of Party B, AA2, which receives it and waits for it to be authenticated by Party A;

Party A activates in its D2A its authentication application AA1 by providing the activation code CA;

Party A with its authentication application AA1 is the one sending a first encrypted message M1, according to the authentication procedure, to authentication application of Party B indicating that it wants to authenticate a transaction that Party A has requested from its first device D1A, and that Party B must have pending to authenticate. Among the transaction data travelling encrypted will be the address of the Sender of the message within the network over which it communicates;

the authentication application of Party B, AA2, receives this first message M1 encrypted according to the authentication procedure and accesses the pending operations to be authenticated to check that Party A has a pending operation to be authenticated and, if it is correct, decrypts the message according to the authentication procedure, and if among the decrypted data is the correct VRM1, checked against its recalculated value, it will be because the message comes from authentication application of Party A as it is the only one that can have encrypted it in the received form, thus Party A is authenticated as the originator of the message against Party B as well as the message and its content. In the event that it does not find a transaction waiting to be authenticated, AA2 will store the message, for a pre-defined short time, waiting for a Party A transaction to arrive from the AO that needs to be authenticated (logically at a given time for the same Party A there cannot be more than one transaction waiting for the other data it needs to initiate its processing);

after verifying that the data of the waiting transaction is compatible with the information received by AA2, AA2 constructs a second M2 encrypted message, according to the authentication procedure, containing the data of the transaction pending authentication and sends it to the Party A authentication application;

the authentication application of Party A receives the encrypted message M2, decrypts it according to the authentication procedure and checks the validity of the VAM2, thus authenticating Party B as the originator of the message against Party A, as well as the message and its content, and the fact that this M2 is the response to the M1 sent. AA1 then presents the transaction data to Party A on its device D2A for it to verify that it corresponds to the transaction data that it has requested from its device D1A and, if so, to authorize, or not, the transaction. To communicate its decision, it creates the M3 message, according to the encryption and authentication procedure, with the transaction data and the result of the authorization to send it to authentication application of Party B;

the authentication application of Party B receives the encrypted message M3 and processes it according to the authentication procedure, and if among the decrypted data is the VAM3 that corresponds to it, it will be because the message comes from Party A's authentication application, as it is the only one that can have encrypted it in the form received, so Party A is authenticated as the creator of the message against Party B, as well as the message and its content, and the fact that this M3 is the response to the M2 sent. It verifies that the data of the operation to be authorized match with those pending to be authenticated/confirmed and communicates to the Operational Application, AO, of Party B the result of the authentication and authorization of the operation performed by Party A. Optionally, it sends an M4 message to Party A's authentication application, AA1, to inform Party A of the completion of the operation;

the operational application of Party B shall send a message to the Party A device D1A informing it of the result of the operation;

A schematic of this operation and message flow is shown in FIG. 3.

An actual application of this way of operating is the case of making a transfer in online banking. Here the D1A is the PC from which online banking is operated; the AO is the bank's application that handles the transfer operations; the DOs are the transfer data; AA2 is the central authentication server that is part of the bank's computer system; AA1 is the authentication application supported by the user's mobile phone, D2A.

In this case, operating in the manner described, the bank, through its central SCA authentication server, knows that message M1 was sent by the application of user Party A, and said user, on receiving message M2, knows that the transfer data received comes from the bank's central SCA authentication server, as only they are the ones who know the decryption key CC used to encrypt message M1. In addition, the SCA knows that the data of the transfer to be carried out that arrived encrypted in message M3 are those that the user has validated with the application on his mobile phone, so that they are the correct ones. If the user had rejected the operation because the transfer data received in M2 do not match those requested from D1A, it will be because there has been an interception and manipulation of the data sent from D1A to the AO (possible man-in-the-middle fraud attempt) since it is the only communication that did not travel encrypted and, therefore, it is susceptible to manipulation.

The nature of the present invention having been sufficiently described, as well as the manner of putting it into practice, it is not considered necessary to explain it further so that any person skilled in the art may understand its scope and the advantages deriving therefrom, it being noted that, within its essential nature, it may be put into practice in other forms of realization which differ in detail from the one indicated by way of example, and to which the protection claimed will also apply provided that the fundamental principle thereof is not altered, changed or modified.

What is claimed is:

1. A method for encrypting and authenticating communications that a first party, Party A, initiates with a second party, Party B, with mutual authentication thereof, the method comprising each of the communicating Parties, Party A and Party B, has an Authentication Application in a device, for exchanging messages between them, where each Authentication Application has:
Identifier, IdA, IdB, which identifies each authentication application from other Authentication Applications integrated in an Authentication System;
Identifier of each Authentication Application of other Parties defined as their potential interlocutors within the authentication system;
a value, different for each interlocution pair, to be used as Encryption Key, CC, for messages;
one or more communication channels between the communicating Parties, through which Authentication Applications exchange messages;
a generator of Pseudorandom Values;
an encryption algorithm, shared with other Parties of the Authentication System, which allows encrypting and decrypting the messages;
a summary function, shared with the other Parties of the Authentication System, which provides summary values;
wherein the authentication application of the first party, Party A:
generates and stores a first Pseudorandom Value, VAM2, to be used as authentication value in message, M2;
prepares information to be sent containing, at least, its identifier and an identifier of the second party, IdA, IdB, the first pseudorandom value, VAM2, and DATA1, where DATA1 contains information to be communicated to the second party, Party B; applies to this information the summary function, shared by the first and the second parties, Party A and Party B, obtaining a first Summary Value, VRM1, of the information to be sent in a first message, M1; encrypts, applying the encryption algorithm shared by the first and second parties, Party A and Party B, with the encryption key, CC, obtaining CC (VAM2, DATA1, VRM1);
sends to the Authentication Application of the second party, Party B, the first message, M1 containing, inter alia, the identifiers, IdB; IdA and CC (VAM2, DATA1, VRM1);
wherein the Authentication Application of the second party, Party B:
receives the first message, M1,
verifies the identifier, IdA, of the first party, Party A,
decrypts with the encryption key, CC, the CC (VAM2, DATA1, VRM1); applies the summary function to the received values, IdB, IdA, VAM2, DATA1, and obtains the Summary Value that the received Summary Value, VRM1, has; and, in the case that a calculated Summary Value, VRM1, coincides with the received VRM1, the decryption has been performed correctly and that who created the first message and performed the encryption has been the first party, Party A, and then:
saves the received Pseudorandom Value, VAM2;
composes a message with the identifier of the first party and its identifier, IdA, IdB, DATA2 and a second Pseudorandom Value VAM2, DATA2 being data to be sent to the first party, Party A, and calculates a second Summary Value, VRM2, by applying the summary function;
sends to the first party, Party A, a second message, M2, containing, the identifier of the first party and its identifier, IdA, IdB, the DATA2, and the second Summary Value, VRM2;
wherein the Authentication Application of the first party, Party A:
receives from the Authentication Application of the second party, Party B, the second message, M2;
verifies the identifier, IdB, of the second party, Party B;
recalculates a value of the second Summary Value, VRM2, on the identifiers, IdA, IdB, the DATA2 and the first Pseudorandom Value, VAM2, which is the Pseudorandom Value, VAM2, sent in the first message, M1, and verifies its coincidence with the received second summary value (VRM2); where, in the case of coincidence, it is the second party, Party B, who calculated the received second Summary Value, VRM2, since only the second party, Party B, has the second Pseudorandom Value VAM2, so that the first and second parties know with whom they are establishing a dialogue.

2. The method of claim 1, wherein, for each delivery-confirmation cycle within the dialogue:
(a) when Party B requires confirmation that the second message M2 has reached Party A, the first message M1 further includes a pseudorandom verification value VAM3, and the authentication application of Party A generates a summary value VRM3 by applying the shared summary function to IdB, IdA, VAM3 and application data DATA3, and transmits a third message M3—carrying IdB, IdA, DATA3 and VRM3—to the authentication application of Party B; and
(b) when Party A requires confirmation that the third message M3 has reached Party B, the first message M1 further includes a pseudorandom verification value VAM4, and the authentication application of Party B generates a summary value VRM4 by applying the shared summary function to IdA, IdB, VAM4 and application data DATA4, and transmits a fourth message M4—carrying IdA, IdB, DATA4 and VRM4—to the authentication application of Party A;
wherein steps (a) and (b) being repeatable with successive unused verification values, VAMx, contained in the first message M1, each time computing a corresponding summary value, VRMx, on the identifiers, a selected VAMx and application data, DATAx, and transmitting a confirmation message, Mx, that carries DATAx and VRMx, until all such VAM values have been used.

3. The method of claim 1, wherein the Authentication Application of the first party, Party A:
generates and stores a further pseudorandom value, CCM2 to be used as encryption keys in the second message, M2;
applies the summary function thereto for calculating the first Summary Value, VRM1;
encrypts, applying the encryption algorithm with the encryption key, CC, obtaining an encrypted part CC (CCM2, VAM2, DATA1, VRM1);
sends to the Authentication Application of the second party, Party B, the first message, M1, containing, the Party A and Party B Application identifiers, IdB, IdA, together with the encrypted part CC (CCM2, VAM2, DATA1, VRM1);

the Authentication Application of the second party, Party B:
receives the first message, M1,
checks the identifier, IdA, of the Authentication Application of the first party, Party A,
decrypts with the encryption key, CC, the encrypted part CC (CCM2, VAM2, DATA1, VRM1) obtaining, inter alia, the first Summary Value, VRM1;
applies the summary function to the received first summary values and obtains its summary value which must match the received first Summary Value, VRM1; in the case where the summary values match then:
stores the received pseudorandom values, CCM2, VAM2;
sends to the Authentication Application of the first party, Party A, the second message, M2, containing, the identifiers, IdA, IdB, together with an encrypted part CCM2 (VAM2, DATA2), with the further pseudorandom value to be used as encryption key, CCM2, of the second Pseudorandom Value, VAM2, and a data to be communicated;
wherein the Authentication Application of the first party, Party A:
receives from the Authentication Application of the second party, Party B, the second message, M2, verifies the identifier, IdB, of the second party, Party B, and
decrypts with CCM2 the second message, M2 to obtain the second Pseudorandom Value, VAM2, and verifies its coincidence with the one sent in the first message, M1.

4. The method of claim 1, wherein the value of the encryption key, CC, used in the encryption and decryption of message, M1, is different for each dialogue in which the first party, Party A, and the second party, Party B, exchange messages, M1 and M2.

5. The method of claim 3, wherein, for each requested delivery confirmation within the dialogue:
(a) when Party B requires confirmation that the second message M2 has reached Party A, the first message M1 further includes a pseudorandom authentication value VAM3 and a corresponding encryption key CCM3, and the authentication application of Party A generates and transmits a third message M3—encrypted with CCM3 and carrying VAM3 together with application data DATA3—to the authentication application of Party B; and
(b) when Party A requires confirmation that the third message M3 has reached Party B, the first message M1 further includes a pseudorandom authentication value V AM4 and a corresponding encryption key CCM4, and the authentication application of Party B generates and transmits a fourth message M4 encrypted with CCM4 and carrying VAM4 to the authentication application of Party A;
steps (a) and (b) being repeatable with successive unused pairs, VAMx, CCMx, contained in the first message M1 until all such pairs have been exhausted.

6. The method of claim 1, wherein a dialogue is automatically initiated between two Authentication Applications, AAA and AAB, of the first and second parties, Party A and Party B, when an expected event arrives at the Authentication Application of the first party, the Authentication Applications being previously active and having shared the encryption key, CC.

7. The method of claim 1, wherein activation of the authentication application, AA, is carried out by providing an activation code, CA, to the Authentication Application, which activation code is a second authentication factor.

8. The method of claim 7, wherein for the Authentication Application, AA, to validate the first message, M1, sent by the other Authentication application involved in the dialogue, a value is to be provided that is a third authentication factor.

9. The method of claim 4, wherein the Authentication Application of the first party, Party A:
generates and stores a further pseudorandom value, CCM2, to be used as encryption keys in the second message, M2;
applies the summary function thereto for calculating the first Summary Value, VRM1, also using a value of parameter ReceivedM2AB, where the parameter ReceivedM2AB, contains a value Yes or NO to indicate to the Authentication Application of the second party, Party B, whether in a last dialogue initiated by the first party, Party A, the first party, Party A, received the second message, M2, from the second party, Party B;
encrypts, applying the encryption algorithm with the encryption key, CC, obtaining an encrypted part CC (CCM2, VAM2, DATA1, VRM1);
sends to the Authentication Application of the second party, Party B, the first message, M1, containing, the identifiers, IdB, IdA, the value of the parameter ReceivedM2AB and the encrypted part CC (CCM2, VAM2, DATA1, VRM1);
once the first message, M1, has been sent, the Authentication Application stores the value NO in the parameter ReceivedM2AB to indicate that the first party, Party A, has initiated the dialogue with the second party, Party B, but has not yet received the second message, M2, from this dialogue;
that the Authentication Application of the second party, Party B:
receives the first message, M1, checks the identifier of the Authentication Application of the first party, Party A,
decrypts with encryption key, CC, the encrypted part CC (CCM2, VAM2, DATA1, VRM1) obtaining, inter alia, the first Summary Value, VRM1;
applies the summary function to received summary values and obtains its summary value which must match the received first Summary Value, VRM1 and:
in the case where summary values VRMs match, then:
stores the received pseudorandom values, CCM2, VAM2;
generates a pseudorandom value, CCSIG, to be used as the encryption key for the first message, M1, of a next dialogue the first party, Party A, has with the second party, Party B, and stores it;
sends to the Authentication Application of the first party, Party A, the second message, M2, containing, the identifiers, IdA, IdB, together with an encrypted part CCM2 (VAM2, DATA2, CCSIG), with the further pseudorandom value to be used as encryption key, CCM2, of the second Pseudorandom Value, VAM2, data to be communicated, and the pseudorandom value, CCSIG;
the value of the encryption key, CC, is stored in another variable, CCUUAB, in case in the next dialogue it is necessary to reuse the value of the encryption key, CC, to decrypt the received first message, M1;
the generated pseudorandom value, CCSIG, is stored as encryption key, CC, which, initially, is used to decrypt a next incoming first message, M1;
in the case where summary values do not match, then:
checks if the parameter ReceivedM2AB has the value NO and, if it is negative, there has been an error or attempted attack on the system;

if the parameter ReceivedM2AB has the value 'NO' then:
the value of the variable, CCUUAB, is used as encryption key, CC, so that the encryption key used to decrypt the previous first message, M1, received is used as decryption key; this happens as long as the first party, Party A, has not received the second message, M2, from a previous dialogue with a new encryption key to be used in the received pseudorandom value, CCSIG;
decrypts again with the encryption key, CC, the encrypted part CC (CCM2, VAM2, DATA1, VRM1) of the first message, M1;
applies the summary function to the received summary values and obtains a recalculated summary value, VRM1R, and checks if it matches the received first summary value, VRM1; and,
if it does not match, there has been an error or attempted attack on the system;
if they match, the first party, Party A, is the issuer of the first message, M1, and so:
stores the received pseudorandom values, CCM2, VAM2, and generates a new pseudorandom value, CCSIG;
sends to the Authentication Application of the first party, Party A, the second message, M2, containing, the identifiers, IdA, IdB, together with the encrypted part CCM2 (VAM2, DATA2, CCSIG), with a further second Pseudorandom Value as encryption key, CCM2, of the second Pseudorandom Value, VAM2, the data to be communicated, and the pseudorandom value, CCSIG;
once the second message, M2, is sent, the value of the encryption key, CC, is stored in the variable, CCUUAB, and the pseudorandom value, CCSIG, is stored as encryption key, CC;
and, the Authentication Application of the first party, Party A:
receives from the authentication application of the second party, Party B, the second message, M2, verifies the identifier of the second party, IdB, and decrypts with the further second pseudorandom value, CCM2, the second message, M2, to obtain the second pseudorandom value, VAM2, and to verify whether it matches with the second pseudorandom value, VAM2, sent in the first message, M1, and wherein
in the case where the pseudorandom values match, is that the message was sent by the Authentication Application of the second party, Party B, and then;
stores as encryption key, CC, the value of the pseudorandom value, CCSIG, received in the second message, M2;
stores the value 'YES' in the parameter ReceivedM2AB.

10. The method of claim 4, wherein the encryption key, CC, is selected from the group consisting of:
(a) CCAB, used when Party A originates the first message, M1; and
(b) CCBA, used when Party B originates the first message, M1, CCAB and CCBA being distinct encryption keys, respectively, for dialogues initiated by Party A and Party B.

11. The method of claim 4, wherein
(a) when Party A is the sender of the first message M1, the encryption key CC comprises a key CCAB obtained by applying the summary function shared by Party A and Party B to a value CCSIG, using as a Salt parameter a static secret value that is shared by Party A and Party B; and
(b) when Party B is the sender of the first message M1, the encryption key CC comprises a key CCBA obtained by applying the summary function shared by Party A and Party B to the value CCSIG, using as a Salt parameter a static secret value that is shared by Party A and Party B, and is different to the static secret value when Party A is the sender.

12. An Authentication System for encrypting and authenticating communications, with mutual authentication thereof, the Authentication System comprising an electronic device per communicating party, each electronic device having at least a processor, a communication chip and secure storage means, and having an Authentication Application, AA, for exchanging messages with other electronic devices of the Authentication System,
each Authentication Application having:
its Identifier, which identifies each authentication application, AA, from other Authentication Applications integrated in the Authentication System;
Identifiers of each Authentication Application of other Parties that are defined as their potential interlocutors within the Authentication System;
a value, different for each interlocution pair, to be used as the Encryption Key, CC for messages;
one or more communication channels between Parties, through which Authentication Applications exchange messages;
a generator of Pseudorandom Values;
an encryption algorithm, shared with other Parties the Authentication System, which allows encrypting and decrypting the messages;
a summary function, shared with other Parties of the Authentication System, which provides summary values;
wherein the Authentication Application of a first party, Party A:
generates and stores a first Pseudorandom Value, VAM2 to be used as authentication values, VAMx, in a message, M2;
prepares information to be sent containing, at least, its identifier and an identifier of a second party, Party B, IdA, IdB, the pseudorandom value, VAM2, and DATA1, wherein DATA1 contains information to be communicated to the second party, Party B; applies to this information the summary function, shared by the first and the second parties, Party A and Party B, obtaining a first Summary Value, VRM1, of the information to be sent in a first message, M1; encrypts, applying the encryption algorithm shared by the first and second parties, Party A and Party B, with the encryption key, CC, obtaining an encrypted part CC (VAM2, DATA1, VRM1);
sends to the Authentication Application of the second party, Party B, a the first message, M1 containing, inter alia, the identifiers, IdB; IdA and CC (VAM2, DATA1, VRM1);
wherein the Authentication Application of the second party, Party B:
receives the first message, M1,
verifies the identifier, IdA, of the first party, Party A,
decrypts with the encryption key, CC, the CC (VAM2, DATA1, VRM1); applies the summary function to the received values, IdB, IdA, VAM2, DATA1, and obtains the Summary Value that the received Summary Value, VRM1, has; and, in case that a calculated Summary Value, VRM1, coincides with the received VRM1, the decryption has been performed correctly and that who created the first message and performed the encryption has been the first party, Party A, and then:

saves the received Pseudorandom Value, VAM2;
composes a message with the identifier of the first party and its identifier, IdA, IdB, DATA2 and a second Pseudorandom Value VAM2, DATA2 being data to be sent to the first party, Party A, and calculates a second Summary Value, VRM2, by applying the summary function;
sends to the first party, Party A, a second message, M2, containing, the identifier of the first party and its identifier, IdA, IdB, the DATA2, and the second Summary Value, VRM2;
wherein the Authentication Application of the first party, Party A:
receives from the Authentication Application of the second party, Party B, the second message, M2;
verifies the identifier, IdB, of the second party, Party B;
recalculates a value of the second Summary Value, VRM2, on the identifiers, IdA, IdB, the DATA2 and the first Pseudorandom, VAM2, which is the Pseudorandom Value, VAM2, sent in the first message, M1, and verifies its coincidence with the received second summary value, VRM2; where, in the case of coincidence, it is the second party, Party B, who calculated the received second Summary Value, VRM2, since only the second party, Party B, has the second Pseudorandom Value VAM2, so that the first and second parties know with whom they are establishing a dialogue.

13. The Authentication System of claim 12, for each delivery-confirmation cycle within the dialogue:
(a) when Party B requires confirmation that the second message M2 has reached Party A, the first message M1 further includes a pseudorandom verification value VAM3, and the authentication application of Party A generates a summary value VRM3 by applying the shared summary function to IdB, IdA, VAM3 and application data DATA3, and transmits a third message M3—carrying IdB, IdA, DATA3 and VRM3—to the authentication application of Party B; and
(b) when Party A requires confirmation that the third message M3 has reached Party B, the first message M1 further includes a pseudorandom verification value VAM4, and the authentication application of Party B generates a summary value VRM4 by applying the shared summary function to IdA, IdB, VAM4 and application data DATA4, and transmits a fourth message M4—carrying IdA, IdB, DATA4 and VRM4—to the authentication application of Party A;
wherein steps (a) and (b) being repeatable with successive unused verification values, VAMx, contained in the first message M1, each time computing a corresponding summary value, VRMx, on the identifiers, a selected VAMx and application data, DATAx, and transmitting a confirmation message, Mx, that carries DATAx and VRMx, until all such VAM values have been used.

14. The Authentication System of claim 12, wherein the Authentication Application of the first party, Party A:
generates and stores a further pseudorandom value, CCM2 to be used as encryption keys in the second message, M2;
applies the summary function thereto for calculating the first Summary Value, VRM1;
encrypts, applying the encryption algorithm with the encryption key, CC, obtaining an encrypted part CC (CCM2, VAM2, DATA1, VRM1);
sends to the Authentication Application of the second party, Party B, the first message, M1, containing, the Party A and Party B Application identifiers, IdB, IdA, together with the encrypted part CC (CCM2, VAM2, DATA1, VRM1);
the Authentication Application of the second party, Party B:
receives the first message, M1,
checks the identifier, IdA, of the Authentication Application of the first party, Party A,
decrypts with the encryption key, CC, the encrypted part CC (CCM2, VAM2, DATA1, VRM1) obtaining, inter alia, the first Summary Value, VRM1;
applies the summary function to received summary values and obtains its summary value which must match the received first Summary Value, VRM1; in the case where the summary values match then:
stores the received pseudorandom values, CCM2, VAM2;
sends to the Authentication Application of the first party, Party A, the second message, M2, containing, the identifiers, IdA, IdB, together with an encrypted part CCM2 (VAM2, DATA2), with the further pseudorandom value to be used as encryption key, CCM2, of the second Pseudorandom Value, VAM2, and a data to be communicated;
wherein the Authentication Application of the first party, Party A:
receives from the Authentication Application of the second party, Party B, the second message, M2, verifies the identifier, IdB, of the second party, Party B, and
decrypts with CCM2 the second message, M2 to obtain the second Pseudorandom Value, VAM2, and verifies its coincidence with the one sent in the first message, M1.

15. The Authentication System of claim 12, wherein the value of the encryption key, CC, used in the encryption and decryption of message, M1, is different for each dialogue in which the first party, Party A, and the second party, Party B, exchange messages, M1 and M2.

16. The Authentication System of claim 12, wherein a dialogue is automatically initiated between two Authentication Applications, AAA and AAB, of the first and second parties, Party A and Party B, when an expected event arrives at the Authentication Application of the first party, the Authentication Applications being previously active and having shared the encryption key, CC.

17. The Authentication System of claim 12, wherein activation of the Authentication Application, AA, is carried out by providing an activation code, CA, to the Authentication Application, which activation code is a second authentication factor.

18. The Authentication System of claim 17, wherein for the Authentication Application, AA, to validate the first message, M1, sent by the other Authentication application involved in the dialogue, a value is to be provided that is a third authentication factor.

19. The Authentication system of claim 14, wherein the Authentication Application of the first party, Party A:
generates and stores a further pseudorandom value, CCM2, to be used as encryption keys in the second message, M2;
applies the summary function thereto for calculating the first Summary Value, VRM1, also using a value of parameter ReceivedM2AB, where the parameter ReceivedM2AB, contains a value Yes or NO to indicate to the Authentication Application of the second party, Party B, whether in a last dialogue initiated by the first party, Party A, the first party, Party A, received the second message, M2, from the second party, Party B;

encrypts, applying the encryption algorithm with the encryption key, CC, obtaining an encrypted part CC (CCM2, VAM2, DATA1, VRM1);

sends to the Authentication Application of the second party, Party B, the first message, M1, containing, the identifiers, IdB, IdA, the value of the parameter ReceivedM2AB and the encrypted part CC (CCM2, VAM2, DATA1, VRM1);

once the first message, M1, has been sent, the Authentication Application stores the value NO in the parameter ReceivedM2AB to indicate that the first party, Party A, has initiated the dialogue with the second party, Party B, but has not yet received the second message, M2, from this dialogue;

that the Authentication Application of the second party, Party B:

receives the first message, M1, checks the identifier of the Authentication Application of the first party, Party A, decrypts with encryption key, CC, the encrypted part CC (CCM2, VAM2, DATA1, VRM1) obtaining, inter alia, the first Summary Value, VRM1;

applies the summary function to received summary values and obtains its summary value which must match the received first Summary Value, VRM1 and:

in the case where summary values VRMs match, then:

stores the received pseudorandom values, CCM2, VAM2;

generates a pseudorandom value, CCSIG, to be used as the encryption key for the first message, M1, of a next dialogue the first party, Party A, has with the second party, Party B, and stores it;

sends to the Authentication Application of the first party, Party A, the second message, M2, containing, the identifiers, IdA, IdB, together with an encrypted part CCM2 (VAM2, DATA2, CCSIG), with the further pseudorandom value to be used as encryption key, CCM2, of the second Pseudorandom Value, VAM2, data to be communicated, and the pseudorandom value, CCSIG;

the value of the encryption key, CC, is stored in another variable, CCUUAB, in case in the next dialogue it is necessary to reuse the value of the encryption key, CC, to decrypt the received first message, M1;

the generated pseudorandom value, CCSIG, is stored as encryption key, CC, which, initially, is used to decrypt a next incoming first message, M1;

in the case where summary values do not match, then:

checks if the parameter ReceivedM2AB has the value NO and, if it is negative, there has been an error or attempted attack on the system;

if the parameter ReceivedM2AB has the value 'NO' then:

the value of the variable, CCUUAB, is used as encryption key, CC, so that the encryption key used to decrypt the previous first message, M1, received is used as decryption key; this happens as long as the first party, Party A, has not received the second message, M2, from a previous dialogue with a new encryption key to be used in the received pseudorandom value, CCSIG;

decrypts again with the encryption key, CC, the encrypted part CC (CCM2, VAM2, DATA1, VRM1) of the first message, M1;

applies the summary function to the received summary values and obtains a recalculated summary value, VRM1R, and checks if it matches the received first summary value, VRM1; and, if it does not match, there has been an error or attempted attack on the system;

if they match, is that the first party, Party A, is the issuer of the first message, M1, and so:

stores the received pseudorandom values, CCM2, VAM2, and generates a new pseudorandom value, CCSIG;

sends to the Authentication Application of the first party, Party A, the second message, M2, containing, the identifiers, IdA, IdB, together with the encrypted part CCM2 (VAM2, DATA2, CCSIG), with a further second Pseudorandom Value as encryption key, CCM2, of the second Pseudorandom Value, VAM2, the data to be communicated, and the pseudorandom value, CCSIG;

once the second message, M2, is sent, the value of the encryption key, CC, is stored in the variable, CCUUAB, and the pseudorandom value, CCSIG, is stored as encryption key, CC;

and, the Authentication Application of the first party, Party A:

receives from the authentication application of the second party, Party B, the second message, M2, verifies the identifier of the second party, IdB, and decrypts with the further second pseudorandom value, CCM2, the second message, M2, to obtain the second pseudorandom value, VAM2, and to verify whether it matches with the second pseudorandom value, VAM2, sent in the first message, M1, and wherein in the case where the pseudorandom values match, is that the message was sent by the Authentication Application of the second party, Party B, and then;

stores as encryption key, CC, the value of the pseudorandom value, CCSIG, received in the second message, M2;

stores the value 'YES' in the parameter ReceivedM2AB.

20. The Authentication system of claim 19, wherein the Authentication Applications of the Parties of the Authentication System are configured to, conjointly, carry out the method of claim 1, the communication being initiated by a first party, Party A, with a second party, Party B, as receiver of the communication, the method allowing the Parties to exchange messages between their Authentication Applications.

21. The Authentication System of claim 14, wherein, for each requested delivery confirmation within the dialogue:

(a) when Party B requires confirmation that the second message M2 has reached Party A, the first message, M1, further includes a pseudorandom authentication value VAM3 and a corresponding encryption key CCM3, and the authentication application of Party A generates and transmits a third message M3—encrypted with CCM3 and carrying VAM3 together with application data DATA3—to the authentication application of Party B; and (b) when Party A requires confirmation that the third message M3 has reached Party B, the first message M1 further includes a pseudorandom authentication value V AM4 and a corresponding encryption key CCM4, and the authentication application of Party B generates and transmits a fourth message M4 encrypted with CCM4 and carrying V AM4 to the authentication application of Party A;

steps (a) and (b) being repeatable with successive unused pairs, VAMx, CCMx, contained in the first message, M1, until all such pairs have been exhausted.

* * * * *